July 12, 1955
J. CHUNG
2,712,761
POWER TRANSMISSION UNITS
Filed May 12, 1954
3 Sheets-Sheet 1
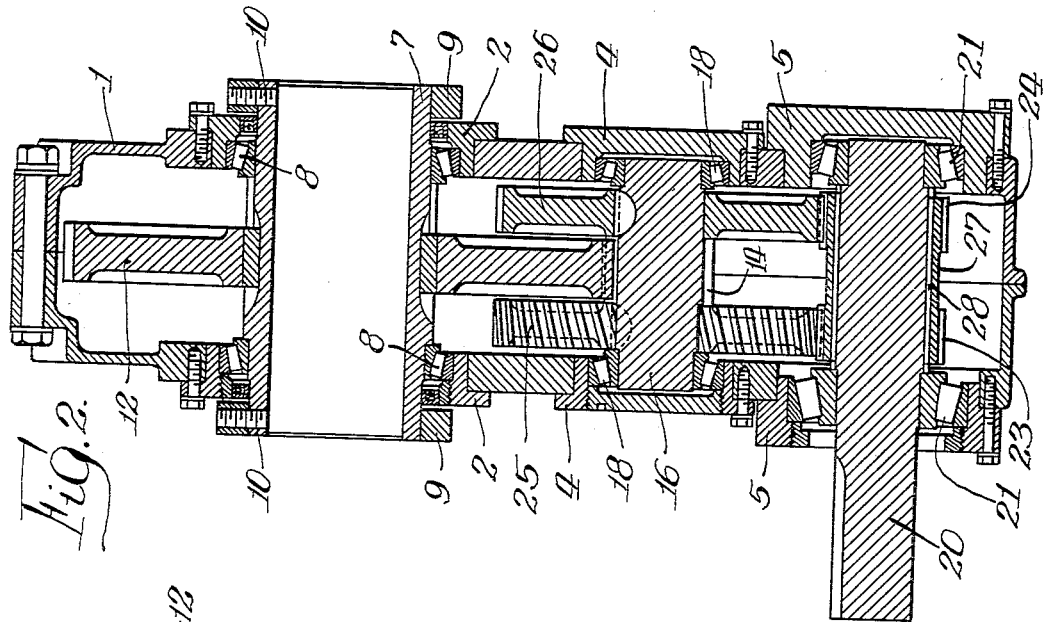
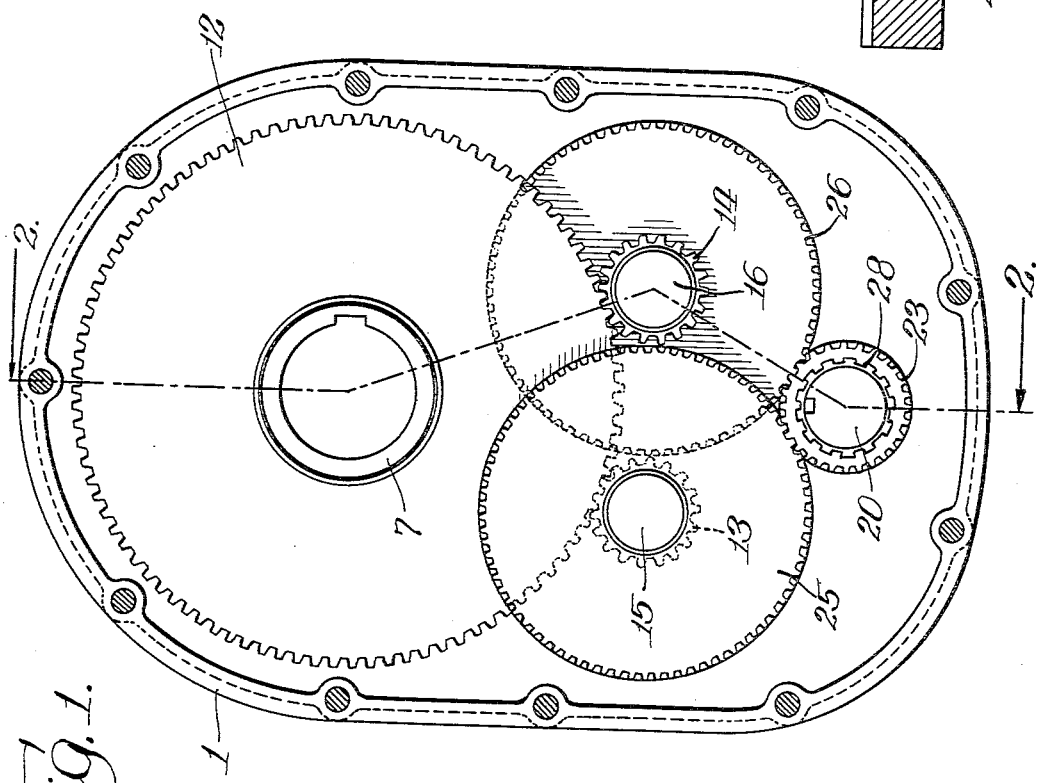
INVENTOR.
Jackson Chung,
BY
Osgood H. Dowell
Atty.

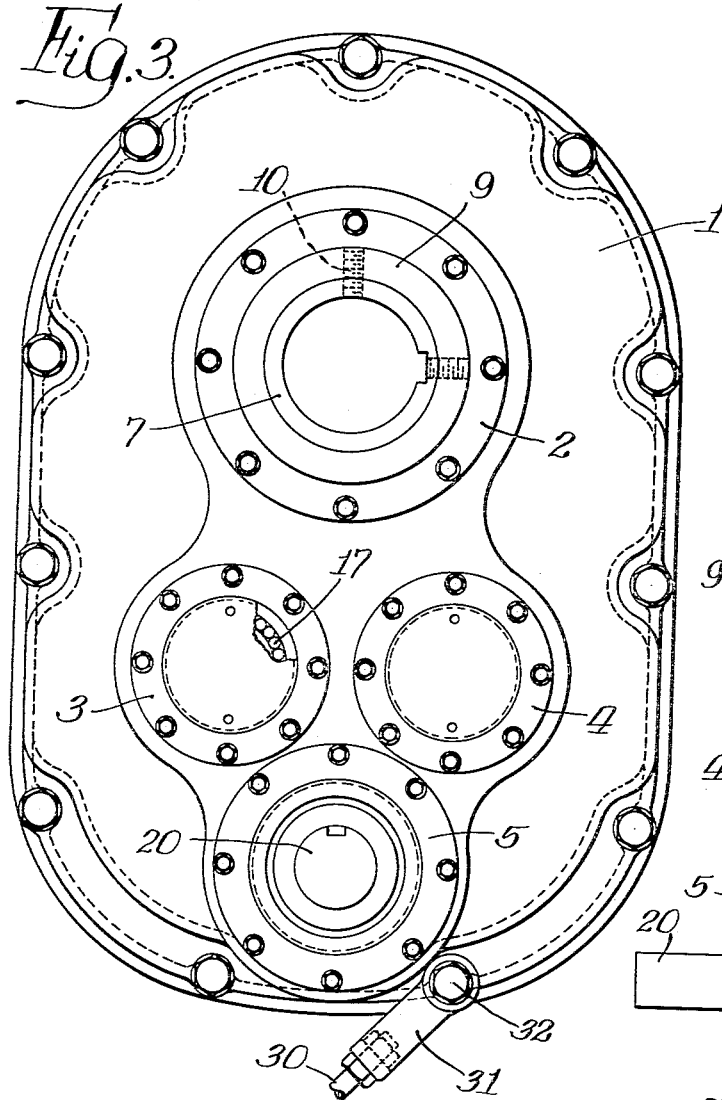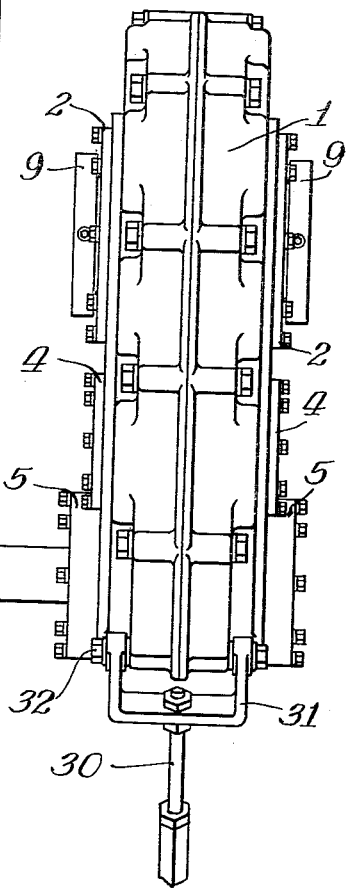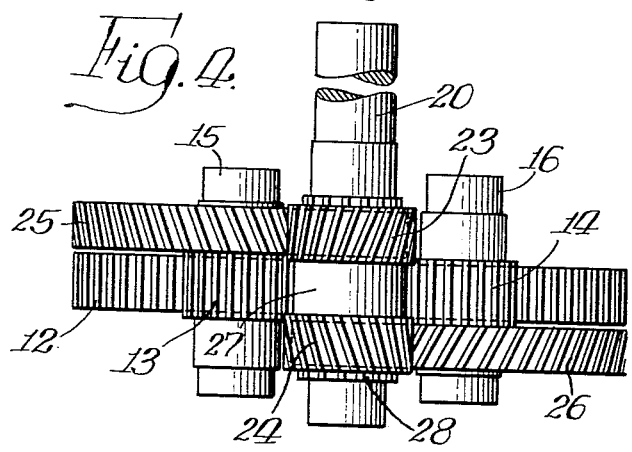

July 12, 1955　　　　　J. CHUNG　　　　　2,712,761
POWER TRANSMISSION UNITS
Filed May 12, 1954　　　　　　　　　　　　　3 Sheets-Sheet 3
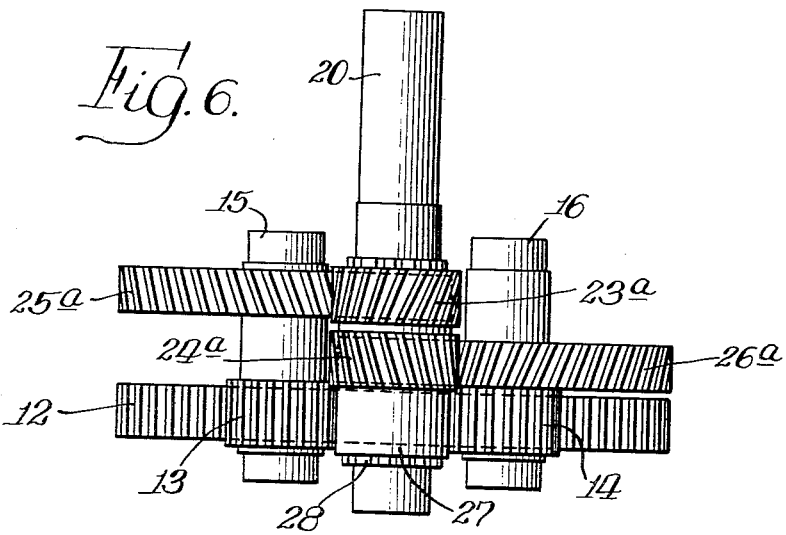
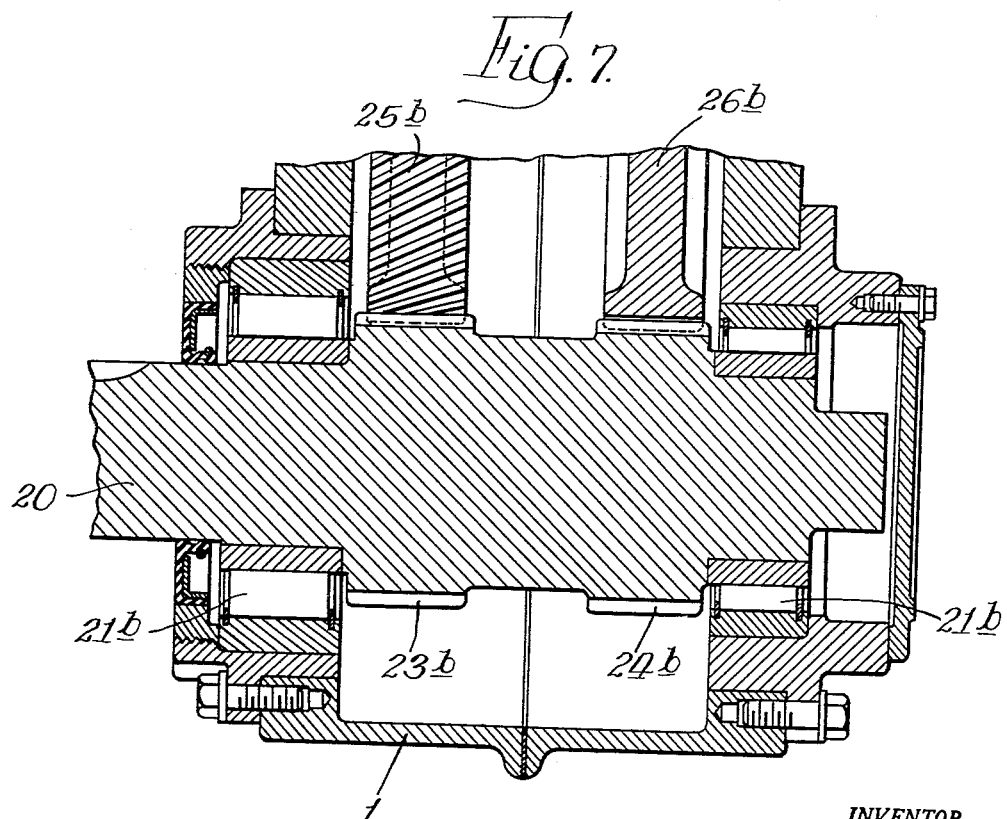
INVENTOR.
Jackson Chung,
BY Osgood H. Dowell
Atty.

United States Patent Office 2,712,761
Patented July 12, 1955

2,712,761
POWER TRANSMISSION UNITS

Jackson Chung, Mishawaka, Ind., assignor to Dodge Manufacturing Corporation, Mishawaka, Ind., a corporation of Indiana Application May 12, 1954, Serial No. 429,191

6 Claims. (Cl. 74—410)

This invention relates to speed-reducing power-transmission units of the type adapted to be mounted on a machine shaft to be driven. Such a unit, of which an example is shown in the patent to Bodle, No. 2,655,818 of October 20, 1953, comprises power input and output shafts connected by speed-reducing gearing in a case rotatably mounted on the output shaft, said output shaft being tubular and adapted to be fitted on and detachably drivingly connected to the machine shaft to be driven.

An object of the present invention is to provide a unit of the type referred to having high power-transmitting capacity for the size and weight of the unit. Further objects ancillary or subsidiary to the foregoing will be understood from the following description with reference to the accompanying drawings.

In said drawings, there is shown for illustration in Figs. 1 to 5 a power-transmission unit for one practicable construction embodying the invention.

Fig. 1 is a front elevation of the illustrative unit having the front section of the gear case thereof removed, showing the speed-reducing gearing of the unit in front elevation.

Fig. 2 is a section taken on the staggered line 2—2 of Fig. 1, looking in the direction of the arrows.

Fig. 3 is a front elevation of the gear case.

Fig. 4 is a bottom plan view of the gearing.

Fig. 5 is a side elevation of the unit showing a portion of an attached torque arm.

Fig. 6 is a view corresponding to Fig. 4 but showing a modified arrangement of the helical reduction gears and helical pinions engaging them.

Fig. 7 is a section of the lower portion of a unit similar to that of the preceding figures but modified by having the helical pinions thereof formed directly on the power input shaft, the latter being axially movable in non-thrust sustaining bearings.

Referring first to Figs. 1 to 5, the gear case of the illustrative unit is designated as a whole by the numeral 1. Mounted in the front and back walls thereof are antifriction bearings for the gear shafts of the unit. In the specific construction shown, each of said walls is composed in part of four annular members or rings 2, 3, 4 and 5 containing the shaft bearings, said rings being fitted in holes therefor in the case walls. This construction facilitates manufacture of the gear case and assemblage of the mechanism therein. As shown, the gear case is split transversely of the shafts therein, its complemental sections being bolted together with an interposed gasket.

A sleeve 7 journalled in the bearings 8 constitutes a tubular power output shaft to be fitted on and keyed to a shaft to be driven (not shown). It will be understood that the illustrative unit may be pendularly supported by the shaft to be driven in the same manner that the unit shown in the Bodle patent is so supported, and that to resist torque reaction the gear case may be held in fixed position either by a torque arm as in the Bodle patent or by fastening the gear case to a fixed member of the machine to which the unit is applied.

As shown, the sleeve 7 constituting the output shaft extends through and beyond the front and back walls of the gear case in aligned openings therefor provided in this instance by the bores of the rings 2 in which the bearings 8 are mounted. Removably fitted on the projecting end portions of said sleeve are clamping collars 9 containing radially disposed set-screws 10 screwed through tapped holes therefor in said collars and extending loosely through unthreaded holes in said end portions of said sleeve. By tightening said screws against the shaft to be driven, said end portions of said sleeve can be rigidly clamped to the shaft to be driven.

Fixed on the tubular output shaft 7 is a main gear 12 of relatively large diameter, which is in mesh with and driven by a pair of pinions 13 and 14 arranged in engagement with said main gear at the under side of its toothed face. These pinions are referred to as secondary pinions to distinguish from the helical pinions hereinafter mentioned. Said pinions 13 and 14 are substantial duplicates or of like form and dimensions and mesh in like manner with said main gear. Said pinions are driven in the same direction and at the same rates of rotation by means presently to be described. The shafts 15 and 16 of said pinions, hereinafter referred to as intermediate shafts, are journalled respectively in the thrust-sustaining bearings 17 and 18, which in this instance are mounted in the rings 3 and 4 respectively.

Journalled in the lower end portion of the gear case is a power input shaft 20 parallel with the output shaft and intermediate shafts aforesaid, said input shaft being journalled in the bearings 21 mounted in the rings 5. Said input shaft is to be motor driven by any suitable means, e. g. by a belt drive (including a multiple V-belt drive or a chain and sprocket drive) from a stationarily mounted motor.

The power input shaft 20 carries thereon a pair of helical pinions 23 and 24. These are substantially alike except that their teeth are of opposite hands or inclined in opposite directions. Said pinions are respectively in mesh with helical reduction gears 25 and 26, which are also substantially alike except that their teeth are of opposite hands for meshing with the teeth of said helical pinions. Said helical gears 25 and 26 are fixed respectively on the shafts 15 and 16 of the secondary pinions 13 and 14 engaging the main gear 12.

Thus the speed reducing gearing of the unit comprises two similar gear trains having a common driven gear 12 on the tubular power output shaft or sleeve 7.

In the illustrative unit the helical pinions 23 and 24 are formed on an axially movable or "floating" sleeve 27 which is slidably fitted on the power input shaft and splined thereto as indicated at 28. In operation, the floating sleeve and pair of helical pinions thereon will automatically assume a position in which the opposing thrusts on said helical pinions will balance each other, wherefore the pressure on the teeth of said pinions will be equalized. The timing of the two gear trains 25, 23, 13, 12 and 26, 24, 14, 12 will then be the same, so that in every rotation of the input shaft 20 corresponding teeth of the secondary pinions 13 and 14 will simultaneously engage and coact with equal pressure with teeth of the driven gear 12. Thus the load on the unit is shared equally by the two gear trains. The power-transmission capacity of the unit, allowing for losses by friction, is nearly double that of either of said gear trains.

The face widths of the helical gears 25 and 26 are less than the face widths of the helical pinions 23 and 24, allowing axial movement of said pinions for self-equalization of tooth pressures while insuring coaction of the teeth of said pinions with those of said gears 25 and 26 for the full lengths of the latter. Incidentally the invention permits utilization of relatively narrow helical gears, as is desirable for compactness and ease in manufacturing.

Since the load is divided between two gear trains, the interengaging teeth of the main gear 12 and secondary pinions 13 and 14, as well as the interengaging teeth of the helical gears and pinions, may be of substantially less size and strength than would be required in a conventional unit having a single gear train to give equivalent or comparable power-transmission capacity.

In assembling the unit, if the helical pinions 23 and 24 do not both mesh properly with their respective helical reduction gears 25 and 26, a slight turning of the power input shaft will cause axial movement of said pinions until by screw action they both mesh properly with said reduction gears.

It is desirable to provide a unit having the gearing compactly arranged in a case of a width not much if any greater than required to accommodate the large main gear 12. Such a construction is exemplified by the illustrative unit, wherein the gear case and gearing are symmetrical with respect to a medial plane coincident with the axes of the power input and output shafts, and the intermediate shafts 15 and 16 are so centered at opposite sides of said plane that the secondary pinions 13 and 14 engage the gear 12 at its under side, while the helical reduction gears 25 and 26, which in this instance are arranged at opposite sides of and closely adjacent to the gear 12, are of such diameter and so centered that the breadth of the mechanism at the plane of the axes of said intermediate shafts is no more than about equal to the diameter of the main gear 12.

The four parallel shafts of the illustrative unit may be considered as centered at the vertices of an imaginary diamond shaped figure formed by drawing lines from the centers of the input and output shafts to the centers of the intermediate shafts. The lines drawn from the center of the tubular output shaft to the centers of the intermediate shafts would form between them an acute angle of preferably less than forty-five degrees.

In Figs. 3 and 5 there is partially shown a torque arm 30 for holding the gear case in fixed position when the illustrative unit is in operative use for driving the shaft on which it is mounted. Said torque arm is of substantially the same construction and for the same functioning as that of the Bodle patent aforesaid, but specifically improved by having a forked or yoke-shaped end portion 31 straddling the lower end portion of the gear case and pivotally connected thereto by a through-bolt 32 arranged near the middle of the gear case. This construction is desirable in view of the high torque reaction imposed on the gear case of the illustrative unit.

As shown in Fig. 6, the illustrative unit may be modified by arranging the helical gears and helical pinions engaging them at the same side instead of at opposite sides of the main gear 12. In said figure, the helical pinions are designated by the symbols 23ª and 24ª, and the helical reduction gears in mesh with said pinions are designated by the symbols 25ª and 26ª.

Another modification is shown in Fig. 7, wherein the helical pinions 23ᵇ and 24ᵇ, instead of being formed on an axially movable sleeve, are formed directly on the power input shaft 20, said shaft in this instance being journalled in non-thrust-sustaining bearings 21ᵇ to allow such axial movement of the shaft and pinions thereon as may be necessary for the purpose of the invention.

Obviously the details of the illustrative unit may be variously modified to suit different conditions and requirements.

I claim:

1. A power transmission unit of the class described comprising a gear case, a tubular power output shaft comprising a sleeve journalled in and extending through opposite walls of said case and adapted to be fitted on and detachably drivingly connected to a shaft to be driven, a power input shaft and a pair of intermediate shafts extending between and journalled in said walls of said case, said input shaft being parallel to and below said sleeve and said intermediate shafts being at opposite sides of the plane of the axes of said input shaft and sleeve, and duplex speed-reducing gearing in said case drivingly connecting said input shaft and sleeve, said gearing comprising a pair of helical pinions of opposite hands on said input shaft, helical reduction gears on said intermedite shafts meshing with said helical pinions, secondary pinions on said intermediate shafts, and a main gear of relatively large diameter on said sleeve in mesh with and driven by said secondary pinions.

2. A power transmission unit of the class described comprising a gear case, a tubular power output shaft comprising a sleeve journalled in and extending through opposite walls of said case and adapted to be fitted on and detachably drivingly connected to a shaft to be driven, a power input shaft and a pair of intermediate shafts extending between and journalled in said walls of said case, said input shaft being parallel to and below said sleeve and said intermediate shafts being at opposite sides of the plane of the axes of said input shaft and sleeve, and duplex speed-reducing gearing in said case drivingly connecting said input shaft and sleeve, said gearing comprising an axially movable sleeve slidably fitted on and splined to said input shaft, a pair of helical pinions of opposite hands formed on said last mentioned sleeve, helical reduction gears on said intermediate shafts in mesh with said helical pinions, secondary pinions on said intermediate shafts, and a main gear of relatively large diameter on said first mentioned sleeve in mesh with and driven by said secondary pinions.

3. A power transmission unit of the class described comprising a gear case, a tubular power output shaft comprising a sleeve journalled in and extending through opposite walls of said case and adapted to be fitted on and detachably drivingly connected to a shaft to be driven, a power input shaft and a pair of intermediate shafts extending between and journalled in said walls of said case, said input shaft being parallel to and below said sleeve and said intermediate shafts being at opposite sides of the plane of the axes of said input shaft and sleeve, and duplex speed-reducing gearing in said case drivingly connecting said input shaft and sleeve, said gearing comprising a pair of helical pinions of opposite hands on said input shaft, helical reduction gears on said intermediate shafts meshing with said helical pinions, secondary pinions on said intermediate shafts, and a main gear of relatively large diameter on said sleeve in mesh with and driven by said secondary pinions, said input shaft being axially movable and having said helical pinions fixed thereon.

4. A power transmission unit of the class described comprising a gear case, a tubular power output shaft comprising a sleeve journalled in and extending through opposite walls of said case and adapted to be fitted on and detachably drivingly connected to a shaft to be driven, a power input shaft and a pair of intermediate shafts extending between and journalled in said walls of said case, said input shaft being parallel to and below said sleeve and said intermediate shafts being at opposite sides of the plane of the axes of said input shaft and sleeve, and duplex speed-reducing gearing in said case drivingly connecting said input shaft and sleeve, said gearing comprising a pair of helical pinions of opposite hands on said input shaft, helical reduction gears on said intermediate shafts meshing with said helical pinions, secondary pinions on said intermediate shafts, and a main gear of relatively large diameter on said sleeve in mesh with and driven by said secondary pinions, said intermediate shafts being so centered that said secondary pinions engage the under side of said main gear and said helical pinions engage said helical gears below the plane of the axes of said intermediate shafts.

5. A power transmission unit of the class described comprising a gear case, a tubular power output shaft comprising a sleeve journalled in and extending through opposite walls of said case and adapted to be fitted on and detachably drivingly connected to a shaft to be driven, a power input shaft and a pair of intermediate shafts extending between and journalled in said walls of said case, said input shaft being parallel to and below said sleeve and said intermediate shafts being at opposite sides of the plane of the axes of said input shaft and sleeve, and duplex speed-reducing gearing in said case drivingly connecting said input shaft and sleeve, said gearing comprising a pair of helical pinions of opposite hands on said input shaft, helical reduction gears on said intermediate shafts meshing with said helical pinions, secondary pinions on said intermediate shafts, and a main gear of relatively large diameter on said sleeve in mesh with and driven by said secondary pinions, said intermediate shafts being so centered that said secondary pinions engage the under side of said main gear and said helical pinions engage said helical gears below the plane of the axes of said intermediate shafts, the width of the gearing at said last mentioned plane being substantially equal to the diameter of said main gear.

6. A power transmission unit of the class described comprising a gear case, a tubular power output shaft comprising a sleeve journalled in and extending through opposite walls of said case and adapted to be fitted on and detachably drivingly connected to a shaft to be driven, a power input shaft and a pair of intermediate shafts extending between and journalled in said walls of said case, said input shaft being parallel to and below said sleeve and said intermediate shafts being at opposite sides of the plane of the axes of said input shaft and sleeve, and duplex speed-reducing gearing in said case drivingly connecting said input shaft and sleeve, said gearing comprising a pair of helical pinions of opposite hands on said input shaft, helical reduction gears on said intermediate shafts meshing with said helical pinions, secondary pinions on said intermediate shafts, and a main gear of relatively large diameter on said sleeve in mesh with and driven by said secondary pinions, said helical gears being at opposite sides of and closely adjacent to said main gear.

No references cited.